(12) United States Patent
Roa-Quispe et al.

(10) Patent No.: US 11,892,697 B2
(45) Date of Patent: Feb. 6, 2024

(54) SLIDEABLE TRAY ASSEMBLY WITH LABEL HOLDER

(71) Applicant: Belden Canada ULC, Saint-Laurent (CA)

(72) Inventors: Christian Roa-Quispe, Laval (CA); Oscar Alberto Lazarte Barrios, Montreal (CA)

(73) Assignee: BELDEN CANADA ULC, Saint-Laurent (CA)

( * ) Notice: Subject to any disclaimer, the term of this patent is extended or adjusted under 35 U.S.C. 154(b) by 0 days.

(21) Appl. No.: 17/654,426

(22) Filed: Mar. 11, 2022

(65) Prior Publication Data

US 2022/0291469 A1    Sep. 15, 2022

Related U.S. Application Data

(60) Provisional application No. 63/160,129, filed on Mar. 12, 2021.

(51) Int. Cl.
*G02B 6/00* (2006.01)
*G02B 6/44* (2006.01)

(52) U.S. Cl.
CPC ......... *G02B 6/4452* (2013.01); *G02B 6/4455* (2013.01)

(58) Field of Classification Search
CPC .. G02B 6/4452; G02B 6/4455; G02B 6/4453; G02B 6/00
See application file for complete search history.

(56) References Cited

U.S. PATENT DOCUMENTS

| | | | |
|---|---|---|---|
| 8,712,206 B2 | 4/2014 | Cooke et al. | |
| 9,020,320 B2 | 4/2015 | Cooke et al. | |
| 9,291,788 B2* | 3/2016 | Rudenick | G02B 6/4454 |
| 9,678,295 B2* | 6/2017 | Giraud | G02B 6/4452 |
| 9,690,065 B2 | 6/2017 | Wiltjer et al. | |
| 10,094,996 B2 | 10/2018 | Cooke et al. | |
| 10,120,153 B2 | 11/2018 | Cooke et al. | |
| 10,209,471 B2 | 2/2019 | Campbell et al. | |
| 10,215,944 B2 | 2/2019 | Sedor et al. | |
| 10,222,570 B2 | 3/2019 | Cooke et al. | |
| 10,268,013 B2 | 4/2019 | Wiltjer et al. | |
| 10,317,637 B2 | 6/2019 | Wiltjer et al. | |
| 10,422,971 B2 | 9/2019 | Cooke et al. | |
| 10,444,456 B2 | 10/2019 | Cooke et al. | |
| 10,459,184 B2 | 10/2019 | Cooke et al. | |

(Continued)

*Primary Examiner* — Jennifer Doan
(74) *Attorney, Agent, or Firm* — Lavery, de Billy, L.L.P.; Hugh Mansfield

(57) ABSTRACT

There is disclosed a fiber optic cassette cabinet assembly comprising a plurality of trays, each tray comprising a flat surface for receiving fiber optic cassettes arranged side by side, a second flat surface positioned in front of the cassettes received on the tray and pivotally mounted about a first axis between the forward ends and a label holder positioned above the second flat surface and pivotally mounted about a second axis between the forward ends. The tray is moveable between one of a retracted position, where the cassettes are completely within the tray receiving space, and an extended position where the cassettes extend at least partially in front of the cabinet opening. In the extended position a forward edge of the second surface is tiltable downwards about the first axis and a forward edge of the transparent label holder is tiltable upwards about the second axis.

20 Claims, 9 Drawing Sheets

(56) References Cited

U.S. PATENT DOCUMENTS

| | | |
|---|---|---|
| 10,564,378 B2 | 2/2020 | Cooke et al. |
| 10,598,884 B2 * | 3/2020 | Fontaine .............. G02B 6/4455 |
| 2019/0101717 A1 * | 4/2019 | Pilon ................... G02B 6/4455 |

* cited by examiner

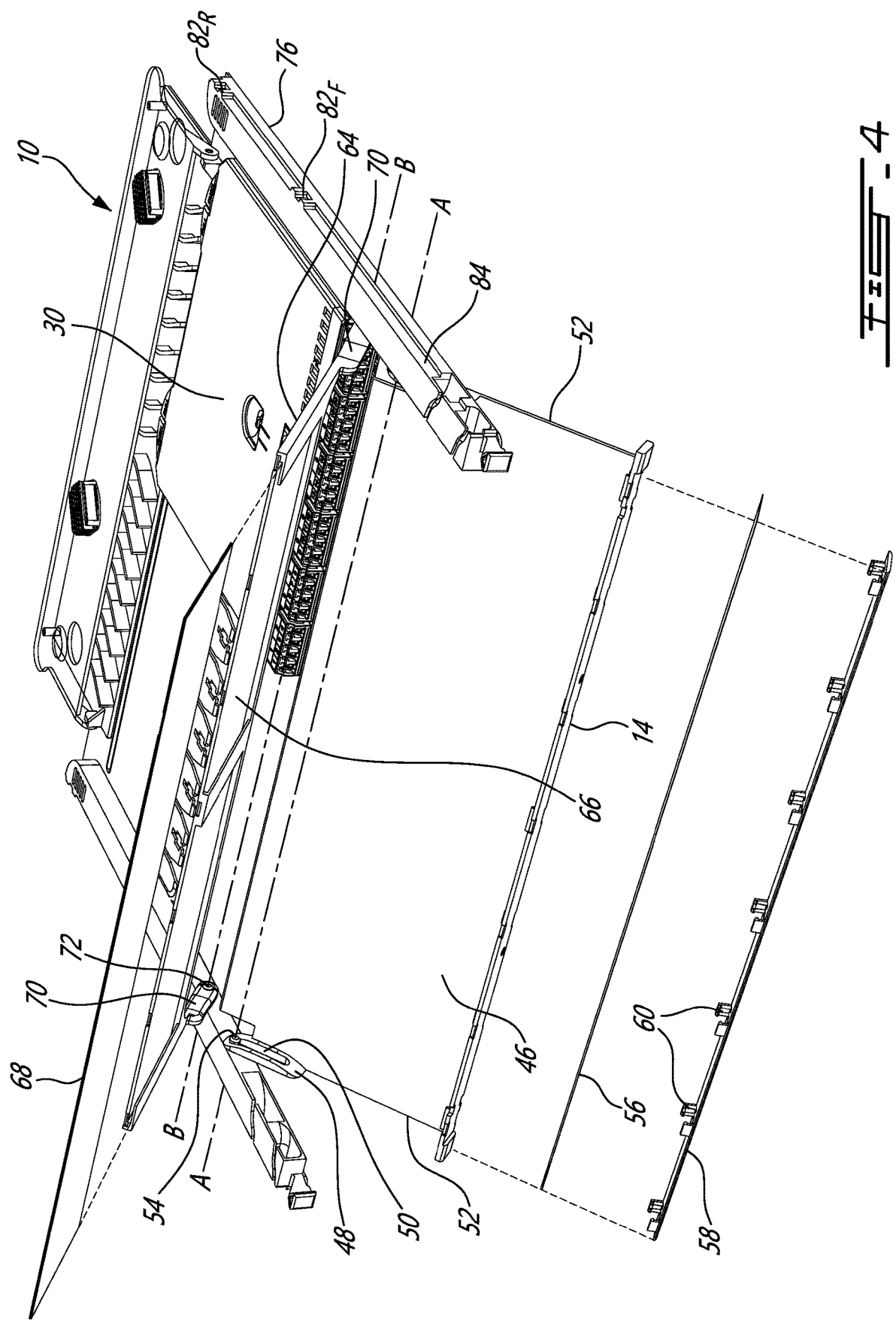

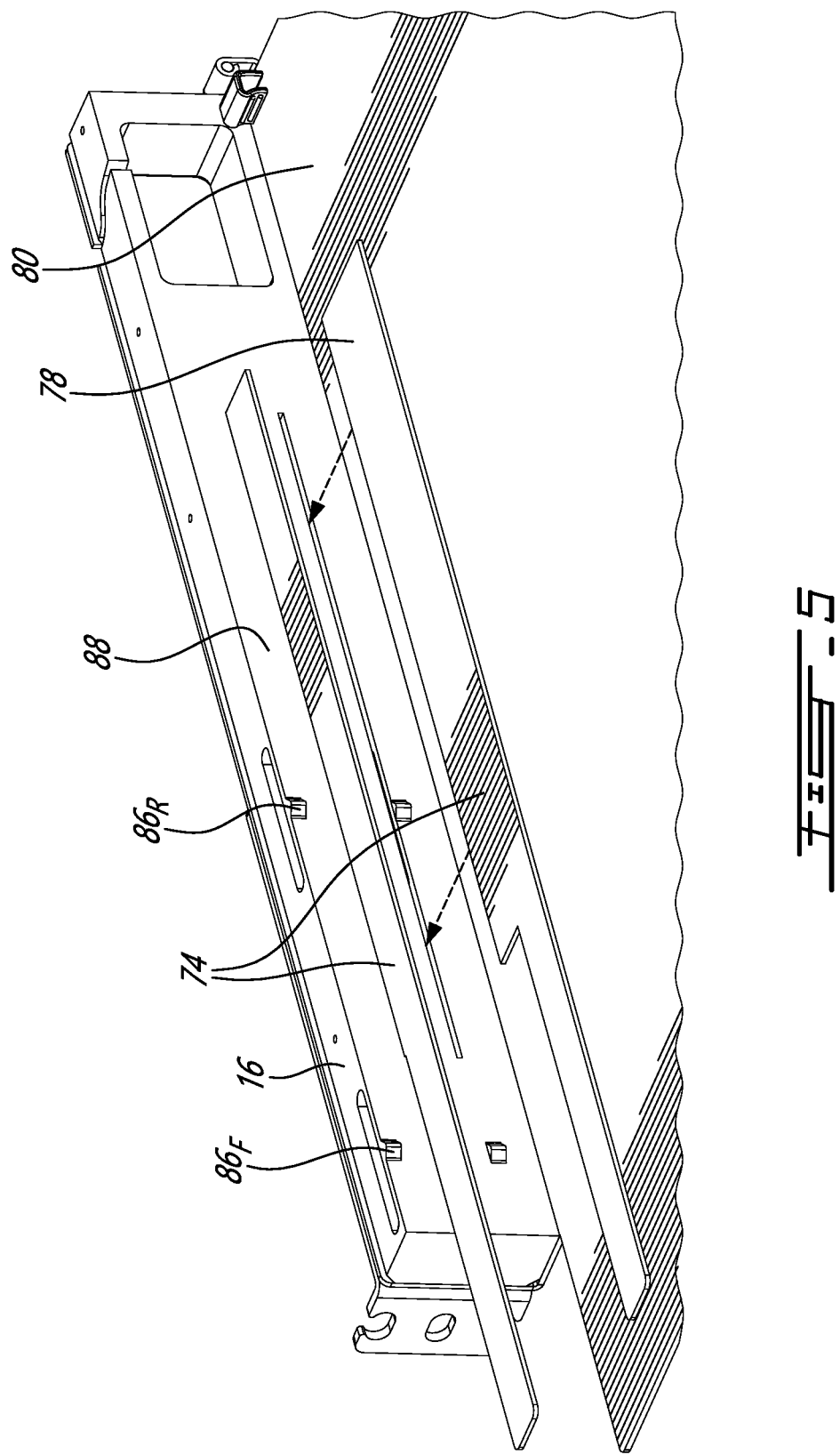

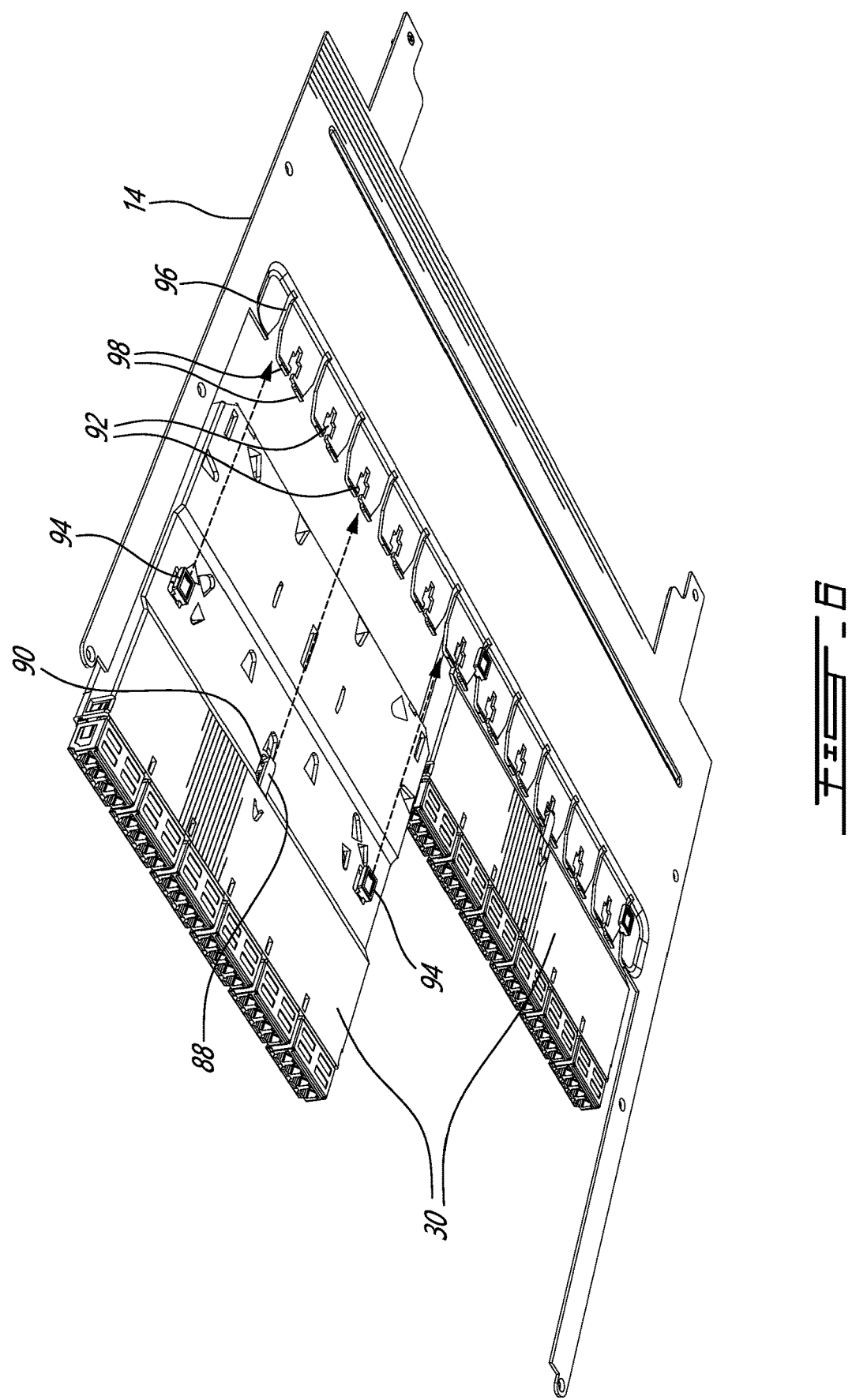

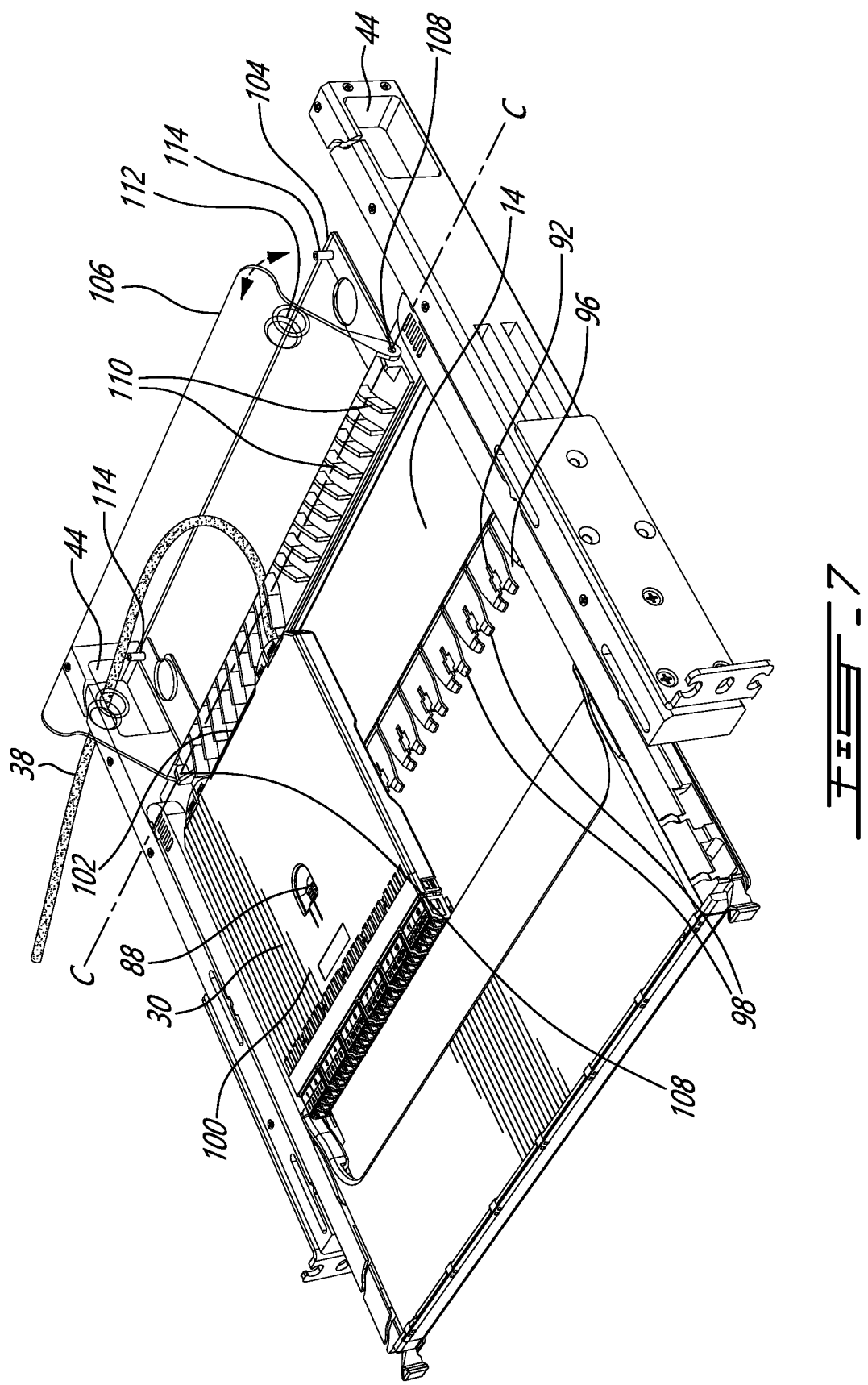

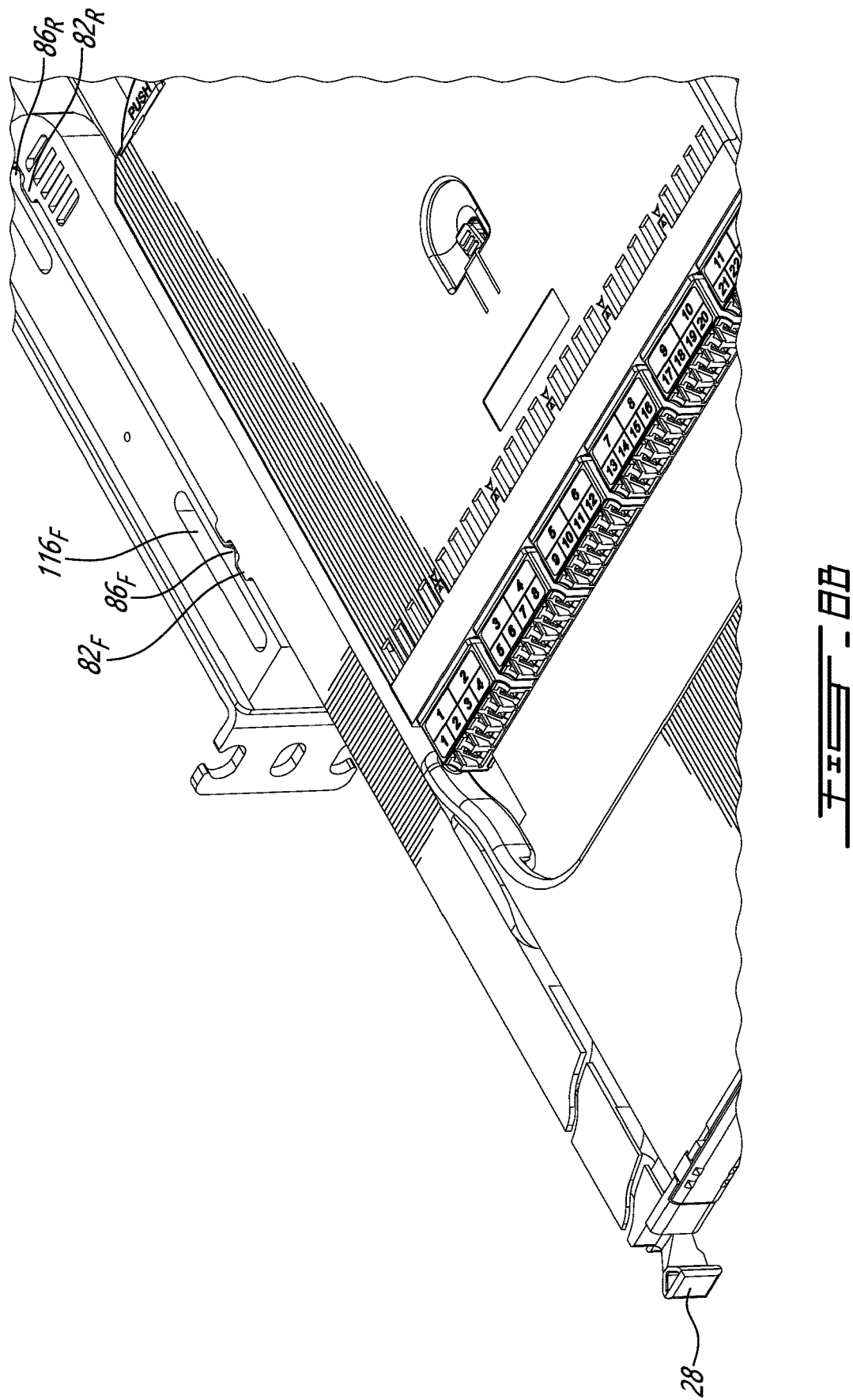

SLIDEABLE TRAY ASSEMBLY WITH LABEL HOLDER

CROSS REFERENCE TO RELATED APPLICATIONS

This application claims benefit, under 35 U.S.C. § 119(e) of U.S. provisional application Ser. No. 63/160,129 filed on Mar. 12, 2021 and which is incorporated herein in its entirety by reference.

FIELD OF THE INVENTION

The present invention relates to a slideable tray assembly with label holder.

BACKGROUND TO THE INVENTION

The prior art discloses cabinets suitable for mounting in a conventional 19" rack and comprising slideable trays on which fiberoptic cassettes can be arranged. One drawback of such prior art designs is that they are unduly complex and assembled from a large number of parts. Additionally, such prior art designs are typically heavy.

SUMMARY OF THE INVENTION

In order to address the above and other drawbacks there is provided a fiber optic cassette cabinet assembly comprising two opposed side walls, a top wall and a bottom wall, the walls together defining a tray receiving space, a forward edge of each of the walls defining an opening into the tray receiving space, and a plurality of trays, each tray comprising a fixed flat surface for receiving a plurality of fiber optic cassettes arranged side by side, a pair of side edges arranged substantially in parallel on either side of the tray, wherein a forward end of each of the side edges extends in front of the cassettes received on the tray, a second flat surface positioned in front of the cassettes received on the tray and pivotally mounted about a first axis between the forward ends and a label holder positioned above the second flat surface and pivotally mounted about a second axis between the forward ends, wherein the tray is moveable between one of a retracted position, wherein the cassettes installed on the tray are completely within the tray receiving space, and an extended position wherein the cassettes installed on the tray extend at least partially in front of the opening and further wherein when in the extended position a forward edge of the second surface is tiltable downwards about the first axis and a forward edge of the transparent label holder is tiltable upwards about the second axis.

BRIEF DESCRIPTION OF THE DRAWINGS

FIG. 4 provides a partially exploded raised right front perspective view of a slideable tray assembly with label holder with an upper tray extended and in accordance with an illustrative embodiment of the present invention;

FIG. 5 provides a detailed perspective view of a side edge and support plates in accordance with an illustrative embodiment of the present invention;

FIG. 6 provides a lower right perspective view of a tray with a cassette positioned for installation and in accordance with an illustrative embodiment of the present invention;

FIG. 7 provides a raised right perspective view of a slideable tray assembly with label holder with an upper tray extended and cassette removed and in accordance with an illustrative embodiment of the present invention; and FIGS. 8A and 8B provide raised right detailed perspective views of a tray in respectively a closed position and an open position and in accordance with an illustrative embodiment of the present invention.

DETAILED DESCRIPTION OF THE ILLUSTRATIVE EMBODIMENTS

Figure 1:
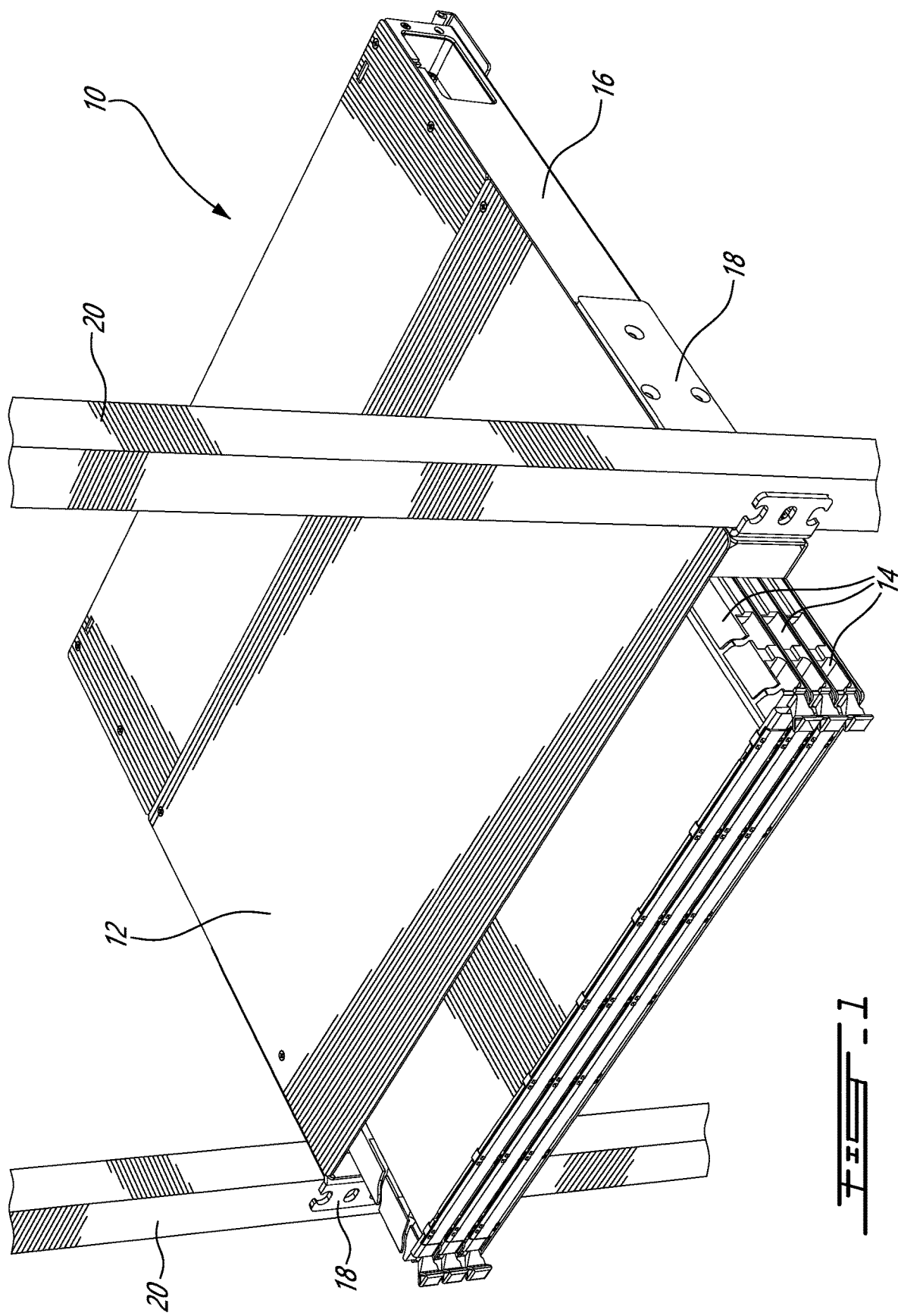
FIG. 1 provides a raised right perspective view of a slideable tray assembly with label holder in a rack and in accordance with an illustrative embodiment of the present invention.

Referring now to FIG. 1, a slideable tray assembly with label holder, generally referred to using the reference numeral 10, will now be described. The assembly 10 comprises a housing 12 adapted to house optical equipment, such as a plurality of trays as in 14 which support fibre optic equipment (not shown). The housing 12 of the assembly 10 comprises on each one of two side walls 16 a flange 18 for the fixation of the housing 12 on two beams 20 of a rack, in particular a standard size rack for the accommodation of a plurality of such slideable tray assemblies 10 or other types of standardized networking equipment (not shown).

Figure 2:
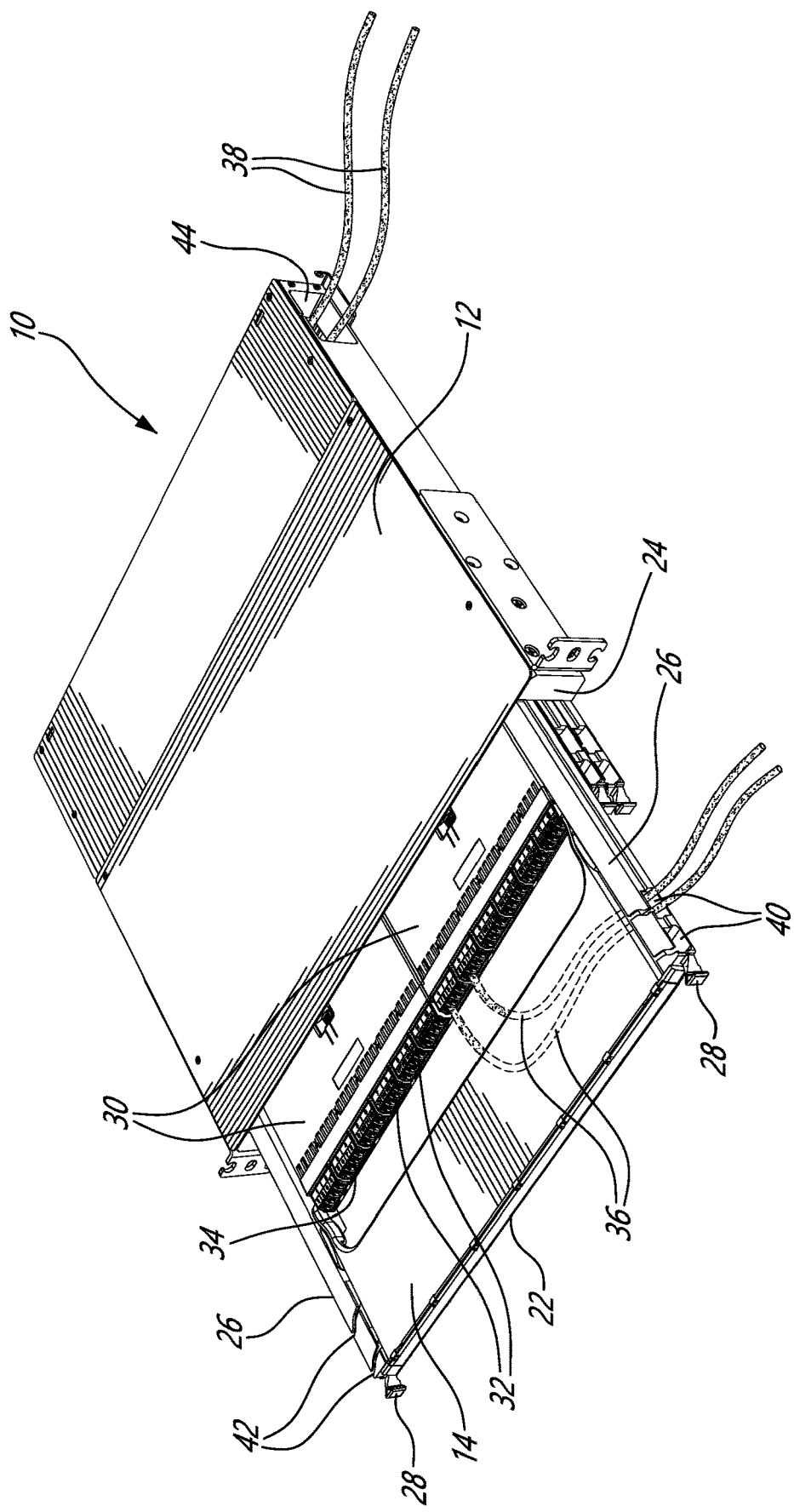
FIG. 2 provides a raised right perspective view of a slideable tray assembly with label holder with an upper tray extended and in accordance with an illustrative embodiment of the present invention.

Referring to FIG. 2 in addition to FIG. 1, each of the plurality of trays 14 is slideable between a retracted position, where the tray 14 is largely enclosed in the housing 12, and an extended position, where the front 22 of the tray 14 is positioned away from a front 24 of the housing 12. Each tray further comprises a pair of opposed side edges 26 each comprising, in order to slide the tray 14, a pair of knobs 28 at an end thereof.

Still referring to FIGS. 1 and 2, as discussed above each tray 14 receives fiber optic equipment such as one or more of a plurality of fiber optic cassettes 30 each illustratively comprising a plurality of receptacles 32 arranged along a front 34 thereof for terminating a respective one of a plurality of first optic fibers 36. Illustratively, each of the microcassettes 30 is in the form of a cross connect and interconnects each of the first optic fibers 36 terminated at one of the receptacles 32 with second optic fibers 38 terminated at a back (not shown) of the microcassettes 30. Openings 40 are provided in each of the pair of opposed side edges 26 allowing for the passage of the first optic fibers 36 and each opening comprises a slot 42 allowing individual first optic fibers 36 to be easily inserted into and removed from their respective opening 40. Additionally, an opening 44 is provided towards a rear end of the two side walls 16 of the housing 12 to allow the second optic fiber(s) 38 to exit the rear of the housing 12.

Figure 3:
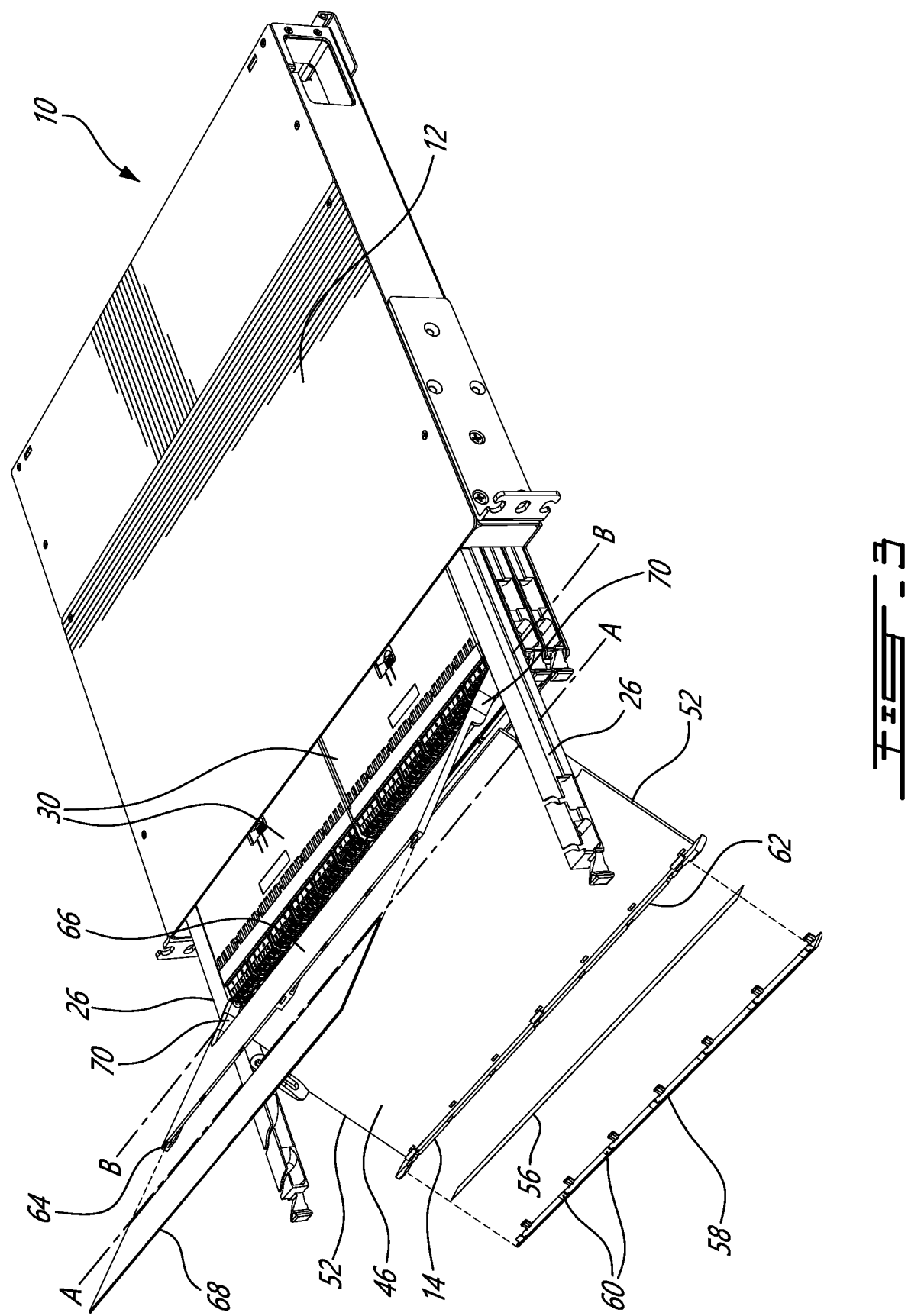
FIG. 3 provides a partially exploded raised right perspective view of a slideable tray assembly with label holder with an upper tray extended and in accordance with an illustrative embodiment of the present invention.

Referring now to FIGS. 3 and 4, each tray 14 further comprises a front tray portion 46 tiltable about an axis A-A between a normally horizontal position, where the tray 14 can be inserted into and retracted from the housing 12 and a tilted position. The front tray portion 46 is slidably and rotatably secured between the pair of opposed side edges 26. In this regard, each front tray portion 46 comprises a flange 48 comprising a slot 50 on each side edge 52. The slots 50 in the flanges 48 slideably receive respective ones of a pair of opposed bosses 54 about which the front tray portion 46 can be tilted and which together define the axis A-A. The front tray portion 46 illustratively further comprises a label 56, on which identification information or the like may be printed, and a label cover 58 manufactured from a transparent plastic or the like. The label cover comprises a series of flexible clips 60 which engage a lip 62 formed in the front of the front ray portion 46.

Still referring to FIGS. 3 and 4, a label holder 64 is also proved which is tiltable about an axis B-B. The label holder 64 is rotatably secured between the pair of opposed side edges 26. In this regard, each label holder 64 comprises a transparent center portion 66 for holding a card 68 or the like onto which identification information of the like may be printed, and a pair or arms 70 which extend from respective sides of the center portion 66. The outer end of each arm 70 is rotatable about a respective boss 72, one in each of the opposed side edges 26, and which together define the axis B-B. With the tray 14 in the extended position, the label holder 64 can be raised, for example, to gain axis to cables (not shown) terminated at the microcassettes 30.

Still referring to FIGS. 3 and 4, in order to tilt the front tray portion 46 of a given tray 14 about axis A-A, the given tray 14 is illustratively placed in the extended position. The front tray portion 46 can then be slid forward on the slots 50 within which the bosses 54 run and away from the front of the microcassettes 30. When the bosses 54 reach the ends of their respective slots 50, the front tray portion 46 can be rotated downwards about the axis A-A. Similarly, with given tray 14 in the extended position, the label holder 64 can be rotated about the axis B-B, for example to gain access to one or more fiber optic cables (not shown) which are traversing the front tray portion 46 to be terminated at a respective microcassette 30.

Referring now to FIG. 5, in order to support the trays 14 at a given height, a series of pairs of support plates 74 are imbedded in an opposed fashion in respective ones of the two side walls 16. Referring back to FIG. 4 in addition to FIG. 5, the undersides 76 of the opposed side edges 26 of each tray 14 slideably rest on an upper surfaces 78 of the respective pair of support plates 74 and held in place by gravity. Of note is that the lowest tray 14 simply slideably rests on the bottom 80 of the housing 12.

Referring back to FIG. 4 in addition to FIG. 5, in order to limit the travel of the tray 14 and provide an indication of the extent to which the tray has been extended from the housing, notch features $82_F$, $82_R$ (such as a notch, boss or bump or the like) positioned along and outside 84 of each the opposed side edges 26 are engagable by corresponding tab features $86_F$, $86_R$ moulded or otherwise formed on the inside 88 of each of the two side walls 16. As will now be understood by a person of ordinary skill in the art, when the tray 14 is in the retracted, or closed, position the forward notch feature $82_F$ is engaged by a rearward one of the corresponding tab features $86_R$. Similarly, when the tray 14 is in the extended position the notch feature $82_F$ is engaged by a forward one of the corresponding tab features $86_F$. Further sliding of the tray 14 forward when in the extended position allows the tray to be completely removed from the housing 12.

Referring now to FIG. 6, each cassette 30 is removeably securable to a respective tray 14 by a locking mechanism 88. An illustrative embodiment of such a locking mechanism is disclosed in U.S. Pat. No. 10,598,884 which is incorporated herein by reference in its entirety. The locking mechanism 88 comprises flexible tabs 90 which are receivable within a respective one of a plurality of cut-outs/slots 92 machined or otherwise formed in the tray 14. Additionally, in order to stabilise the assembly, T-shaped tabs 94 are provided which are receivable within respective one of a plurality of tab receiving slots 96 machined or otherwise formed in the tray 14. As a cassette 30 is slid onto the tray 14 during installation the flexible tab 90 snaps into its respective slot 92 as each of the T-shaped tabs 94 are received in their respective slots 96. The ends 98 of the tray 14 are illustratively angled slightly downwards inter alia to reduce damage to the cassettes 30 during installation.

Referring to FIG. 7 in addition to FIG. 6, the locking mechanism 88 is conveniently actuatable from the top surface 100 of the cassette 30. Actuating the locking mechanism 88 when a cassette 30 is secured on the tray 14 releases the flexible tab 90 from its respective slot 92 allowing the cassette 30 to be retracted from the tray 12.

Still referring to FIG. 7, as discussed above, a plurality of second optic fibers 38, which exit the rear of the tray 14 via an opening 44, are terminated at the back 102 of each microcassette 30. In order to support the plurality of second optic fibers 38, the tray 14 further comprises a rearward surface 104 which extends away from the back 102 of the microcassettes 30. A cover 106, illustratively manufactured from a transparent material is also provided inter alia to reduce interference of optic fiber cables on a lower tray 14 with those on an upper tray 14. The cover 106 is hingedly mounted to its respective tray 14 adjacent the backs 102 of the microcassettes 30 via a hinge assembly 108 and pivotable about an axis C-C and such that the second optic fiber cables 38 can be accessed. Features such as fins 110 and spools 112 are provided in order to guide the second optic fiber cables 38. Additionally, a pair of small support posts 114 are provided to maintain the cover 106 displaced from the rearward surface 104.

Figure 8A:
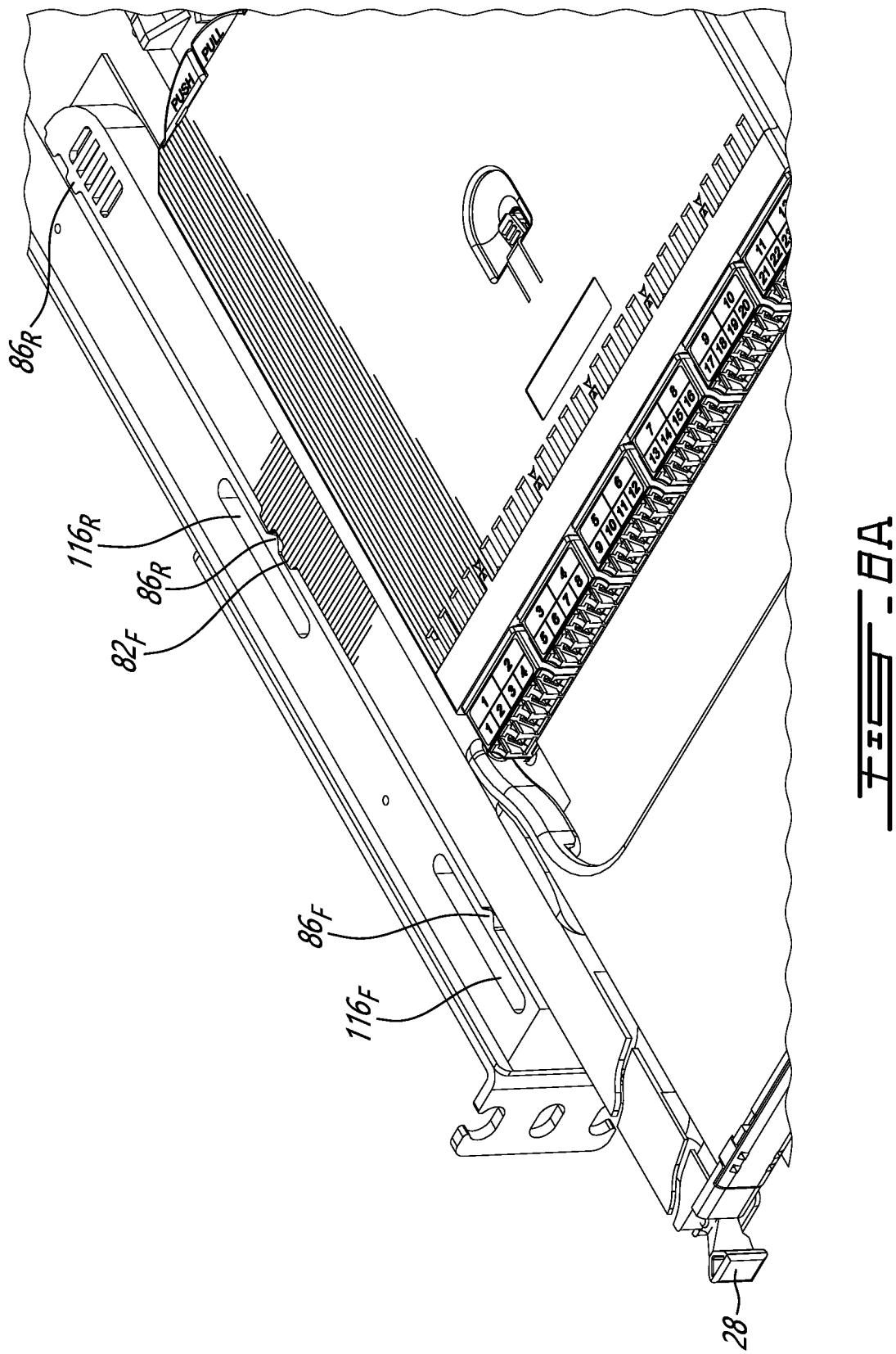

Referring now to FIG. 8A, as discussed above when the tray 14 is in the retracted, or closed, position the feature notch $82_F$ is engaged by a rearward one of the corresponding tab features $86_R$. With reference to FIG. 8B, similarly, when the tray 14 is in the extended position, for example by a user pulling on the tray using the knobs 28, the notch feature $82_F$ is engaged by a forward one of the corresponding tab features $86_F$. The tab features $86_R$, $86_F$ are provided adjacent respective cutaway portions $116_R$, $116_F$ and such that the tab features $86_R$, $86_F$ are moveable elastically in a direction lateral to a direction of tray travel and such that the tab features $86_R$, $86_F$ can engage or disengage the notch feature $82_R$, $82_F$ while providing for tactile feedback of the engagement/disengagement.

Although the present invention has been described hereinabove by way of specific embodiments thereof, it can be modified, without departing from the spirit and nature of the subject invention as defined in the appended claims.

The invention claimed is:

1. A fiber optic cassette cabinet assembly comprising:
    two opposed side walls, a top wall and a bottom wall, the walls together defining a tray receiving space, a forward edge of each of the walls defining an opening into the tray receiving space; and
    a plurality of trays, each tray comprising a fixed flat surface for receiving a plurality of fiber optic cassettes arranged side by side, a pair of side edges arranged substantially in parallel on either side of the tray, wherein a forward end of each of the side edges extends in front of the cassettes received on the tray, a second flat surface positioned in front of the cassettes received on the tray and pivotally mounted about a first axis between the forward ends and a label holder positioned above the second flat surface and pivotally mounted about a second axis between the forward ends;

wherein the tray is moveable between one of a retracted position, wherein the cassettes installed on the tray are completely within the tray receiving space, and an extended position wherein the cassettes installed on the tray extend at least partially in front of the opening and further wherein when in the extended position a forward edge of the second surface is tiltable downwards about the first axis and a forward edge of the label holder is tiltable upwards about the second axis.

2. The fiber optic cassette cabinet assembly of claim 1, further comprising a plurality of elongate tray receiving plates extending horizontally partially into the housing from each of the opposed side walls, wherein each of the plates on a first of the sidewalls is arranged in the same horizontal plane as a respective one of the plates on a second of the sidewalls and wherein when installed in the tray receiving space each of the side edges slideably rests on a respective one of the tray receiving plates.

3. The fiber optic cassette cabinet assembly of claim 1, wherein the label holder is transparent.

4. The fiber optic cassette cabinet assembly of claim 1, wherein each of the side edges further comprises features which engage with corresponding features on an adjacent one of the sidewalls to releasably hold the tray in the retracted position and the extended position.

5. The fiber optic cassette cabinet assembly of claim 1, wherein when in the retracted position the second flat surface is aligned with the first surface and the label holder is arranged substantially in parallel to and above the second surface, the label holder and the second flat surface defining a space there between.

6. The fiber optic cassette cabinet assembly of claim 1, wherein each of the fiber optic cassettes terminates at least one optic fiber and further wherein when in the horizontal position the second flat surface is configured for supporting the at least one optic fiber.

7. The fiber optic cassette cabinet assembly of claim 6, wherein when the second flat surface and the label holder are both in the horizontal position, a portion of the at least one optic fiber is positioned between the second flat surface and the label holder.

8. A fiber optic tray assembly for supporting a fiber optic equipment in a fiber optic cabinet assembly, the tray comprising:
a first surface for receiving the fiber optic equipment;
a pair of edges arranged on either side of the first surface and configured to be slidingly received in a tray receiving space of the cabinet assembly;
a second surface arranged in front of the fiber optic equipment received on the first surface;
a label holder arranged above the second flat surface;
wherein a forward end of each of the edges extends in front of the fiber optic equipment received on the first surface;

wherein the second surface is secured for rotation between the forward ends about a first axis between a first horizontal position and a second lowered position;
wherein the label holder is secured for rotation between the forward ends about a second axis between a first horizontal position and a second raised position.

9. The fiber optic tray assembly of claim 8, wherein the first axis and the second axis are in parallel.

10. The fiber optic tray assembly of claim 8, wherein the first axis and the second axis are at a right angle to the direction of travel of the tray when slidingly received.

11. The fiber optic tray assembly of claim 8, wherein the label holder is transparent and configured for receiving a card adjacent and underside and wherein the card is visible from above through the label holder.

12. The fiber optic tray assembly of claim 8, wherein the fiber equipment terminates a plurality of optic fibers and further wherein when in the horizontal position the second surface is configured for supporting the at least one optic fiber.

13. The fiber optic cassette cabinet assembly of claim 12, wherein when the second surface and the label holder are both in the horizontal position, a portion of each of the plurality of optic fibers is positioned between the second flat surface and the label holder.

14. A tray assembly configured for supporting an optic fiber communications equipment, the tray comprising:
a tray portion on which the optic fiber communications equipment is secured;
a pair of edge portions on either side the tray portion wherein a forward end portion of each of the edge edges extends beyond a front of the tray portion;
a front tray portion arranged in front of the tray portion;
a label holder arranged above the front tray portion;
wherein the front tray portion is mounted for rotation between the forward end portions between a horizontal position and a lowered position;
wherein the label holder is secured for rotation between the forward ends between a horizontal position and a raised position.

15. The tray assembly of claim 14, wherein the front tray portion is mounted for rotation about a first axis and the label holder is mounted for rotation about a second axis.

16. The tray assembly of claim 15, wherein the first axis and the second axis are in parallel.

17. The tray assembly of claim 15, wherein the second axis is closer to the tray portion than the first axis.

18. The tray assembly of claim 15, wherein the first axis is moveable relative to the tray portion.

19. The tray assembly of claim 14, wherein the front tray portion is configured for sliding away from the tray portion and the optic fiber communications equipment.

20. The tray assembly of claim 19, wherein prior to rotation between the horizontal position and the lowered position the front tray portion is slid away from the tray portion.

* * * * *